UNITED STATES PATENT OFFICE.

LEOPOLD POLLAK, OF WILSDORF, NEAR BODENBACH, AUSTRIA-HUNGARY, ASSIGNOR OF ONE-HALF TO ALBERT REDLICH, OF WILSDORF, NEAR BODENBACH, AUSTRIA-HUNGARY.

PROCESS OF TREATING EXTRACTS OF QUEBRACHO.

No. 900,038.　　Specification of Letters Patent.　　Patented Sept. 29, 1908.

Application filed December 20, 1907. Serial No. 407,341.

*To all whom it may concern:*

Be it known that I, LEOPOLD POLLAK, subject of the Emperor of Austria-Hungary, residing at Wilsdorf, near Bodenbach, Bohemia, Austria-Hungary, have invented certain new and useful Improvements in Processes of Treating Extracts of Quebracho, of which the following is a specification.

This invention relates to a process by means of which the quebracho liquid extracts obtained by hot extraction (diffusion), which as is well known, contain a more or less considerable quantity of slightly soluble tanning substances, the so-called phlobaphenes, are perfectly purified and clarified with the employment of very small quantities of alkali. Moreover the said process renders it possible to make easily soluble the tanning substances that are contained in the said liquid extracts and are slightly soluble, to recover all substances that are capable to have a tanning action and to convert them into a clear and easily soluble condition. For attaining this purpose the hot liquid that is obtained by hot extraction is allowed to cool down, in consequence of which a mud is precipitated from which the liquid that is standing above the same is separated. The mud which consists mostly of resin-like strongly colored substances slightly soluble in water can be saponified and rendered easily soluble by means of very small quantities of alkali and in this condition it has the property to completely clarify the liquid which has been drained off from the mud and which has still a turbid appearance.

For carrying out in practice the part above referred to of the process that forms the subject matter of the present invention, to the mud originating from the liquid that is obtained by hot extraction from quebracho wood, by allowing this liquid to cool, is added a small quantity of an alkali for instance of a solution of potash or of soda. The mixture is then maintained for several hours at a temperature of from 50 to 100° C. and during the whole time it is thoroughly stirred and this is continued until a solution is obtained which also in a cooled condition possesses a clear deep red coloration. The quantity of the alkali that is to be added as well as the duration of the heating of the stirred up mud should be determined empirically by tests. It has been ascertained by experience that in the majority of cases one part by weight of the alkali to 1000 parts by weight of the original liquid treated and that a duration of the operation of from 6 to 7 hours are sufficient. To the liquid separated from the mud as above indicated is then added the said deep red solution in a quantity that is to be determined by tests and during this operation the mixture is thoroughly stirred. Experiments have shown that as a general rule it is sufficient to add to 1000 liters of the drained off liquid about 50 liters of the deep red solution in order to obtain immediately an abundant deposit of flakes. After the lapse of a few hours the liquid is perfectly clear while on the bottom of the vessel a solid precipitate is deposited which upon having been dissolved again by the addition of water and of an alkali in the manner above indicated with reference to the treatment of the mud and by heating for a sufficiently long duration can now be utilized for the clarifying of a further quantity of fresh quebracho liquid obtained by hot extraction after it has been separated from the mud.

The clear liquid obtained in the manner above described and remaining on the top of the mud can be concentrated by evaporation to the degree of concentration which may be desired in each particular case and can even be converted into a dry condition. It forms the pure quebracho extract soluble in cold water and distinguished by special clearness.

For the execution of the process as described until now only a part of the mud has been employed that contains phlobaphenes and that is formed in the first part of the process. It is however important to enable the utilization of the remaining part of the mud for tanning purposes in order to render it possible to apply with advantage all tanning principles contained in the liquid extract of quebracho. For this purpose it is only necessary to mix intimately the remaining part of the deep red solution which has been obtained from the first portion of the mud by the addition of alkali and by heating, with tanning liquids of a high acidity obtained from sumach or other leaves, barks or woods and which are notoriously easily soluble: In consequence of this operation the phlobaphenes contained in the said red solution are converted into a condition in which they are soluble in cold water. The percentage of acid contained in these liquids should correspond more or less to the percentage of alkali contained in the red solution and in case this percentage of acid should not be present in the extracts of the barks etc. in their natural state it can be produced by the addition of suitable acids as for instance of acetic acid.

When the red solution is mixed with the liquid possessing a suitable acidity the mixture becomes turbid and consequently it must be left to stand until the turbidity disappears in consequence of the precipitation of the insoluble substances. The precipitate thus formed consists only of substances that are ineffective for tanning purposes and insoluble in water and the clarified liquid in which all substances that have a tanning action are contained in a clear solution, after its separation from the said precipitate, can now be evaporated to the degree of density required for the extract.

An example of the complete process may be described as follows:—From 2000 kilograms of quebracho wood are obtained after the extraction 2000 liters of turbid liquor and 200 kilograms of sediments when the liquor has cooled down to 25° C. The 200 kilograms of the sediment are mixed with a solution of 2 kilogr. of calcined sodium carbonate, whereby a solution of the sediments takes place and only an insoluble sediment of particles of wood remains undissolved. Of this solution of the sediment 100 liters are added to the 2000 liters of the turbid extract liquor above indicated, the mixture is stirred and the flaky precipitate formed during this operation is allowed to deposit. This deposit will form a coherent cake of about 120 kilograms. The clear liquor is then evaporated while the precipitated part is mixed with the excess of the solution obtained from the sediment of the first operation and to this is added 1 kilogr. more of the dissolved calcined sodium carbonate. The whole mixture is then digested during 5 hours at a temperature of 70° C. In this manner 200 liters of a solution are obtained to which a decoction of 50 kilograms of sumach or 80 kilogr. of pine bark or of hemlock bark are added and besides in order to increase the speed of the work, 1 liter of acetic acid may be added. A precipitate is then separated that deposits within 12 to 15 hours into a solid sediment which cannot be submitted to any further treatment and is removed as refuse, whereas the clear solution which contains all practically useful ingredients is submitted to evaporation.

It is most probable that by means of the above described process the phlobaphenes contained not only in the required extracts of quebracho but also in other slightly soluble tanning extracts can be converted into a condition in which they are easily soluble in cold water.

Claim.

1. The herein described process of clarifying liquid extracts of quebracho wood and for rendering them soluble in cold water, which consists in separating the mud from the liquid which stands above the same after extraction, adding a small quantity of alkali and water to the mud after such separation and applying heat, and adding a quantity of the solution thus obtained to the liquid previously separated from the mud to form flakes.

2. The herein described process of clarifying extracts of quebracho wood and for rendering the same easily soluble in cold water which consists in a hot extraction to form a mud and liquid after cooling, saponifying and rendering soluble said mud by the addition thereto of a small quantity of alkali and water and heating the resultant solution, and adding to said solution a quantity of the liquid previously drawn off from the mud to form flakes, the deposit of which leaves a liquid extract which may be drawn off in a clear condition.

3. The herein described process of clarifying extracts of quebracho wood and for rendering the tanning principles soluble in cold water which consists in adding a small quantity of alkali and water to the mud which is obtained after cooling of the liquid obtained by hot extraction after such mud has been separated from the liquid which stands above the same, and applying heat to such solution, adding a sufficient quantity of the solution thus obtained to the liquid previously drawn off from the mud to form flakes from which the liquid extract is drawn off in a clear condition after the deposit of the flakes, and rendering the phlobaphenes contained in the remaining parts of the mud soluble in cold water by mixing with the solution obtained from the mud a quantity of alkali, and heating the latter mixture with tanning extracts or liquids of higher acidity.

In testimony whereof I have hereunto set my hand in presence of two subscribing witnesses.

LEOPOLD POLLAK.

Witnesses:
ADOLPH FISCHER,
ARTHUR SCHWEIG.